United States Patent
Rajaram et al.

(10) Patent No.: US 7,027,806 B2
(45) Date of Patent: *Apr. 11, 2006

(54) SYSTEM AND METHOD FOR FIELD DOWNLOADING A WIRELESS COMMUNICATIONS DEVICE SOFTWARE CODE SECTION

(75) Inventors: Gowri Rajaram, San Diego, CA (US); Paul Seckendorf, San Diego, CA (US)

(73) Assignee: Kyocera Wireless, Corp., San Diego, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 09/916,900

(22) Filed: Jul. 26, 2001

(65) Prior Publication Data

US 2003/0022663 A1     Jan. 30, 2003

(51) Int. Cl.
*H04M 3/00*     (2006.01)

(52) U.S. Cl. ...................... 455/419; 455/418

(58) Field of Classification Search ............ 455/419, 455/418, 420, 414.1, 412.1; 395/700, 650, 395/705, 710, 712, 653, 703; 709/229, 221, 709/217, 220, 202, 226, 203
See application file for complete search history.

(56) References Cited

U.S. PATENT DOCUMENTS

| | | | |
|---|---|---|---|
| 5,046,082 A * | 9/1991 | Zicker et al. ................ | 455/419 |
| 5,337,255 A | 8/1994 | Seidel et al. | |
| 5,400,389 A * | 3/1995 | Niiyama et al. ............ | 455/418 |
| 5,481,706 A | 1/1996 | Peek | |
| 5,507,009 A * | 4/1996 | Grube et al. ................ | 455/517 |

(Continued)

FOREIGN PATENT DOCUMENTS

DE     19502728     8/1996

(Continued)

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.
International Search Report (ISR): PCT/ISA/210 for International Application No. PCT/IB02/02869, ISR dated Oct. 28, 2003, 4 pages.

Primary Examiner—CongVan Tran (57) ABSTRACT

A system and method have been provided for updating system software stored in the memory of a wireless communications device. The method comprises: forming the system software into a first plurality of symbol libraries including a code section address table, a symbol offset address table, a symbol accessor code, a patch library, and read-write data for a plurality of symbol libraries; arranging the code section address table, the symbol offset address table, the symbol accessor code, the read-write data, the patch library, and the symbol accessor code address into a patch manager code section; storing system software for the wireless device in a plurality of current code sections; receiving new code sections via a wireless communications device air interface; storing new code sections in a memory file system section; identifying current code sections for updating; replacing current code sections with new code sections to form updated system software for the wireless device; and, executing the updated system software. In some aspects of the invention, receiving new code sections includes receiving a new patch manager code section; and, replacing current code sections with new code sections to form updated system software for the wireless device includes replacing a current patch manger code section with the new patch manager code section.

52 Claims, 6 Drawing Sheets

U.S. PATENT DOCUMENTS

| | | |
|---|---|---|
| 5,600,823 A | 2/1997 | Sherer et al. |
| 5,673,317 A | 9/1997 | Cooper |
| 5,699,275 A * | 12/1997 | Beasley et al. ............. 395/700 |
| 5,715,462 A | 2/1998 | Iwamoto et al. |
| 5,734,904 A | 3/1998 | Kanamori et al. |
| 5,771,386 A | 6/1998 | Baumbauer |
| 5,784,537 A | 7/1998 | Suzuki et al. |
| 5,790,856 A * | 8/1998 | Lillich ....................... 395/703 |
| 5,835,778 A | 11/1998 | Yoshihara |
| 5,920,826 A | 7/1999 | Metso et al. |
| 5,930,704 A * | 7/1999 | Kay ........................... 455/419 |
| 5,938,766 A | 8/1999 | Anderson et al. |
| 5,960,356 A | 9/1999 | Alperovich et al. |
| 5,974,312 A | 10/1999 | Hayes et al. |
| 6,018,543 A | 1/2000 | Blois et al. |
| 6,023,620 A | 2/2000 | Hansson |
| 6,138,009 A * | 10/2000 | Birgerson ................... 455/419 |
| 6,138,153 A | 10/2000 | Collins et al. |
| 6,247,065 B1 | 6/2001 | Greenspan et al. |
| 6,272,333 B1 * | 8/2001 | Smith ......................... 455/418 |
| 6,275,694 B1 * | 8/2001 | Yoshida et al. ............. 455/419 |
| 6,442,660 B1 | 8/2002 | Henerlau et al. |
| 6,457,174 B1 | 9/2002 | Kuroda et al. |
| 6,460,070 B1 | 10/2002 | Turek et al. |
| 6,498,789 B1 | 12/2002 | Honda |
| 6,549,770 B1 * | 4/2003 | Marran ....................... 455/419 |
| 6,622,017 B1 | 9/2003 | Hoffman |
| 6,633,759 B1 | 10/2003 | Kobayashi |
| 6,643,506 B1 * | 11/2003 | Criss et al. ................. 455/419 |
| 6,754,894 B1 | 6/2004 | Costello et al. |
| 6,754,895 B1 * | 6/2004 | Bartel et al. ................. 717/171 |
| 6,785,541 B1 | 8/2004 | Martin |
| 2001/0000538 A1 | 4/2001 | Kowaguchi |
| 2001/0027500 A1 * | 10/2001 | Matsunaga ................... 710/104 |
| 2001/0051519 A1 | 12/2001 | Shirai |
| 2001/0054161 A1 | 12/2001 | Wooddruff |
| 2002/0026634 A1 | 2/2002 | Shaw |
| 2002/0065041 A1 | 5/2002 | Lunsford et al. |
| 2002/0072359 A1 | 6/2002 | Moles et al. |
| 2003/0060189 A1 | 3/2003 | Minear et al. |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 98/09208 | 3/1998 |
| WO | WO 9922325 | 5/1999 |
| WO | WO 0073912 | 12/2000 |
| WO | WO 0074412 | 12/2000 |

* cited by examiner

| Symbol offset address table | | |
|---|---|---|
| Symbol ID | Code section ID | Offset |
| X_1 | CS_1 | 03 |
| Y_1 | CS_1 | 15 |
| P_1 | CS_2 | 11 |
| Q_1 | CS_2 | 33 |
| AA_3 | CS_2 | 47 |
| ⋮ | | |

SYSTEM AND METHOD FOR FIELD DOWNLOADING A WIRELESS COMMUNICATIONS DEVICE SOFTWARE CODE SECTION

BACKGROUND OF THE INVENTION

1. Field of the Invention

This invention generally relates to wireless communications devices and, more particularly, to a system and method for updating code sections in the system software of a wireless communication device in the field, via an airlink interface.

2. Description of the Related Art

It is not uncommon to release software updates for phones that are already in the field. These updates may relate to problems found in the software once the phones have been manufactured and distributed to the public. Some updates may involve the use of new features on the phone, or services provided by the service provider. Yet other updates may involve regional problems, or problems associated with certain carriers. For example, in certain regions the network layout of carriers may impose airlink interface conditions on the handset that cause the handset to demonstrate unexpected behavior such as improper channel searching, improper call termination, improper audio, or the like.

The traditional approach to such updates has been to recall the wireless communications device, also referred to herein as a wireless device, phone, telephone, or handset, to the nearest carrier retail/service outlet, or to the manufacturer to process the changes. The costs involved in such updates are extensive and eat into the bottom line. Further, the customer is inconvenienced and likely to be irritated. Often times, the practical solution is to issue the customer new phones.

It would be advantageous if wireless communications device software could be upgraded cheaply, and without inconvenience to the customer.

It would be advantageous if wireless communications device software could be upgraded without the customer losing the use of their phones for a significant period of time.

It would be advantageous if wireless communications device software could be updated with a minimum of technician service time, or without the need to send the device into a service facility.

It would be advantageous if the wireless device system software could be differentiated into code sections, so that only specific code sections of system software would need to be replaced, to update the system software. It would be advantageous if these code sections could be communicated to the wireless device via the airlink.

SUMMARY OF THE INVENTION

Wireless communications device software updates give customers the best possible product and user experience. An expensive component of the business involves the recall of handsets to update the software. These updates may be necessary to offer the user additional services or to address problems discovered in the use of the phone after it has been manufactured. The present invention makes it possible to practically upgrade handset software in the field, via the airlink interface.

Accordingly, a method has been provided for updating system software stored in the memory of a wireless communications device. The method comprises: forming the system software into a first plurality of symbol libraries including a code section address table, a symbol offset address table, a symbol accessor code, a patch library, and read-write data for a plurality of symbol libraries; arranging the code section address table, the symbol offset address table, the symbol accessor code, the patch library, the read-write data, and the symbol accessor code address into a patch manager code section; storing system software for the wireless device in a plurality of current code sections; receiving new code sections via a wireless communications device air interface; storing new code sections in a memory file system section; identifying current code sections for updating; replacing current code sections with new code sections to form updated system software for the wireless device; and, executing the updated system software.

In some aspects of the invention, receiving new code sections includes receiving a new patch manager code section; and, replacing current code sections with new code sections to form updated system software for the wireless device includes replacing a current patch manger code section with the new patch manager code section.

Additional details of the above-described method for updating wireless device system software, and a wireless device system for updating system software are presented in detail below.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a wireless device microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor based wireless device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "determining" or "displaying" or "recognizing" or the like, refer to the action and processes of in a wireless device microprocessor system that manipulates and transforms data represented as physical (electronic) quantities within the computer system's registers and memories into other data similarly represented as physical quantities within the wireless device memories or registers or other such information storage, transmission or display devices.

Figure 1:
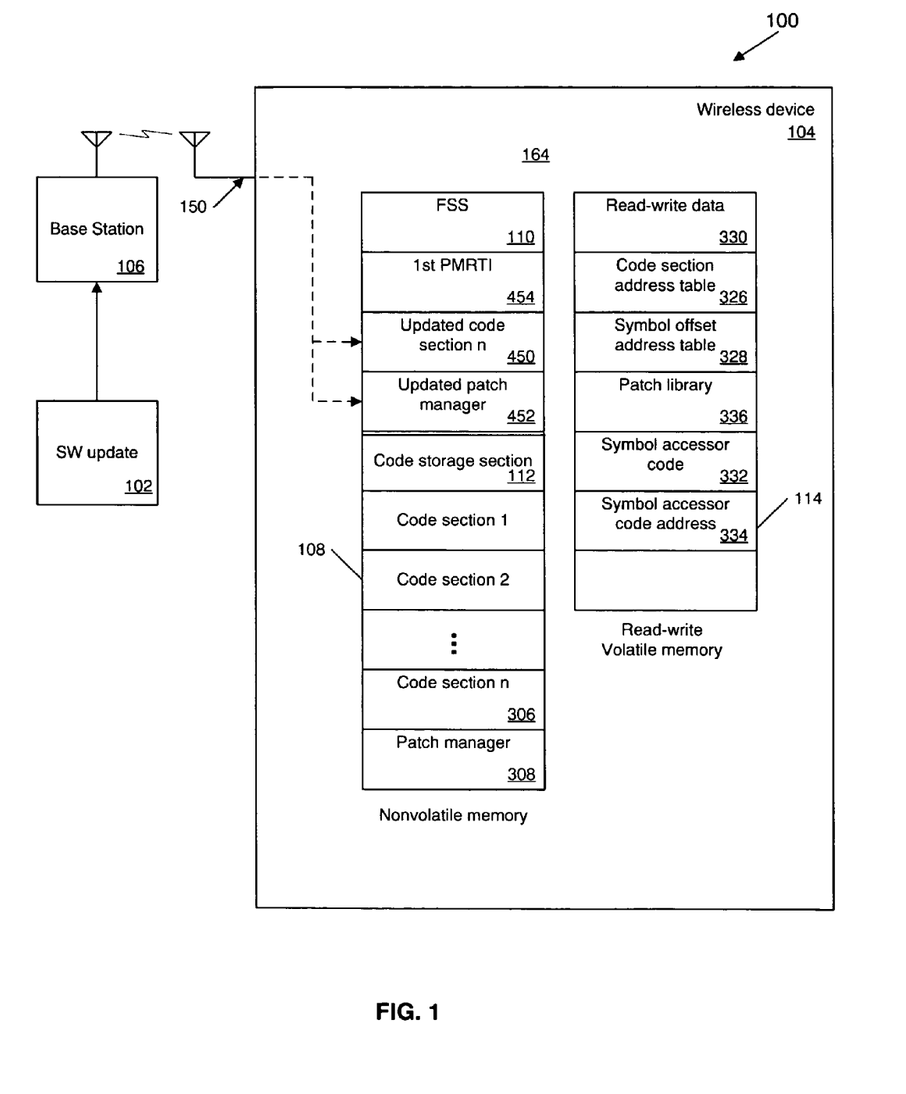
FIG. 1 is a schematic block diagram of the overall wireless device software maintenance system.

FIG. 1 is a schematic block diagram of the overall wireless device software maintenance system 100. The present invention system software organization is presented in detail below, following a general overview of the software maintenance system 100. The general system 100 describes a process of delivering system software updates and instruction sets (programs), and installing the delivered software in a wireless device. System software updates or patch maker instruction sets (PMRTI) are created by the manufacturer of the handsets. The system software is organized into symbol libraries. The symbol libraries are arranged into code sections. When symbol libraries are to be updated, the software update 102 is transported as one or more code sections. The software update is broadcast to wireless devices in the field, of which wireless communications device 104 is representative, or transmitted in separate communications from a base station 106 using well known, conventional air, data or message transport protocols. The invention is not limited to any particular transportation format, as the wireless communications device can be easily modified to process any available over-the-air transport protocol for the purpose of receiving system software and PMRTI updates.

The system software can be viewed as a collection of different subsystems. Code objects can be tightly coupled into one of these abstract subsystems and the resulting collection can be labeled as a symbol library. This provides a logical breakdown of the code base and software patches and fixes can be associated with one of these symbol libraries. In most cases, a single update is associated with one, or at most two, symbol libraries. The rest of the code base, the other symbol libraries, remain unchanged.

The notion of symbol libraries provides a mechanism to deal with code and constants. The read-write (RW) data, on the other hand, fits into a unique individual RW library that contains RAM based data for all libraries.

Once received by the wireless device 104, the transported code section must be processed. This wireless device overwrites a specific code section of nonvolatile memory 108. The nonvolatile memory 108 includes a file system section (FSS) 110 and a code storage section 112. The code section is typically compressed before transport in order to minimize occupancy in the FSS 110. Often the updated code section will be accompanied by its RW data, which is another kind of symbol library that contains all the RW data for each symbol library. Although loaded in random access volatile read-write memory 114 when the system software is executing, the RW data always needs to be stored in the nonvolatile memory 108, so it can be loaded into random access volatile read-write memory 114 each time the wireless device is reset. This includes the first time RW data is loaded into random access volatile read-write memory. As explained in more detail below, the RW data is typically arranged with a patch manager code section.

The system 100 includes the concept of virtual tables. Using such tables, symbol libraries in one code section can be patched (replaced), without breaking (replacing) other parts of the system software (other code sections). Virtual tables execute from random access volatile read-write memory 114 for efficiency purposes. A code section address table and symbol offset address table are virtual tables.

The updated code sections are received by the wireless device 104 and stored in the FSS 110. A wireless device user interface (UI) will typically notify the user that new software is available. In response to UI prompts the user acknowledges the notification and signals the patching or updating operation. Alternately, the updating operation is performed automatically. The wireless device may be unable to perform standard communication tasks as the updating process is performed. The patch manager code section includes a non-volatile read-write driver symbol library that is also loaded into random access volatile read-write memory 114. The non-volatile read-write driver symbol library causes code sections to be overwritten with updated code sections. As shown in the figure, code section n and the patch manager code sections are overwritten with updated code sections. The patch manager code section includes the read-write data, code section address table, and symbol offset address table, as well a symbol accessor code and the symbol accessor code address (discussed below). Portions of this data are invalid when updated code sections are introduced, and an updated patch manager code sections includes read-write data, a code section address table, and a symbol offset address table valid for the updated code sections. Once the updated code sections are loaded into the code storage section 112, the wireless device is reset. Following the reset operation, the wireless device can execute the updated system software. It should also be understood that the patch manager code section may include other symbol libraries that have not been discussed above. These other symbol libraries need not be loaded into read-write volatile memory 114.

Figure 2:
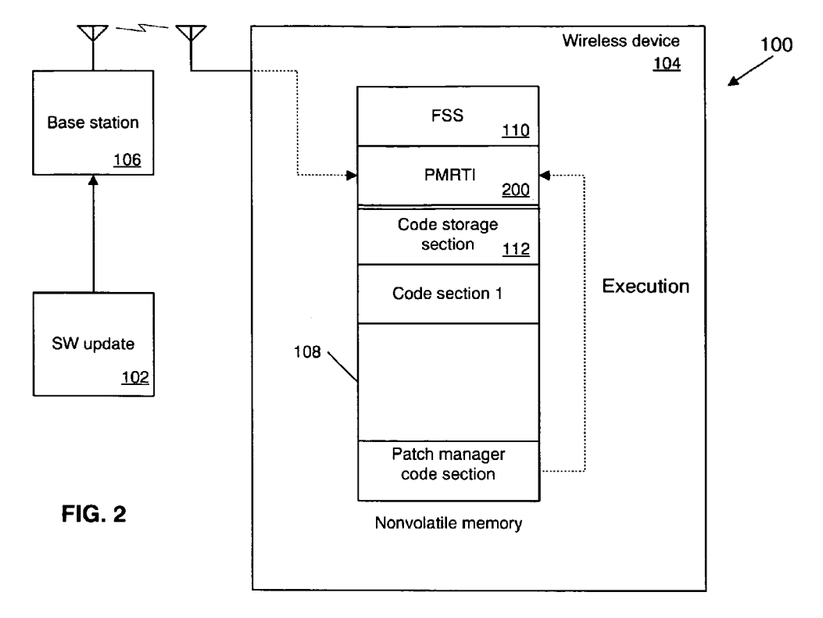
FIG. 2 is a schematic block diagram of the software maintenance system, highlighting the installation of instruction sets via the airlink interface.

FIG. 2 is a schematic block diagram of the software maintenance system 100, highlighting the installation of instruction sets via the airlink interface. In addition to updating system software code sections, the maintenance system 100 can download and install instructions sets or programs, referred to herein as patch manager run time instructions (PMRTI). The PMRTI code section 200 is transported to the wireless device 104 in the same manner as the above-described system software code sections. PMRTI code sections are initially stored in the FSS 110. A PMRTI code section is typically a binary file that may be visualized as compiled instructions to the handset. A PMRTI code section is comprehensive enough to provide for the performance of basic mathematical operations and the performance of conditionally executed operations. For example, an RF calibration PMRTI could perform the following operations:

IF RF CAL ITEM IS LESS THAN X
EXECUTE INSTRUCTION
ELSE
EXECUTE INSTRUCTION

A PMRTI can support basic mathematical operations, such as: addition, subtraction, multiplication, and division. As with the system software code sections, the PMRTI code section may be loaded in response to UI prompts, and the wireless device must be reset after the PMRTI is loaded into code storage section 112. Then the PMRTI section can be executed. If the PMRTI code section is associated with any virtual tables or read-write data, an updated patch manager code section will be transported with the PMRTI for installation in the code storage section 112. Alternately, the PMRTI can be kept and processed from the FSS 110. After the handset 104 has executed all the instructions in the PMRTI section, the PMRTI section can be deleted from the FSS 110.

In some aspects of the invention, the organization of the system software into symbol libraries may impact the size of the volatile memory 114 and nonvolatile memory 108 required for execution. This is due to the fact that the code sections are typically larger than the symbol libraries arranged in the code sections. These larger code sections exist to accommodate updated code sections. Organizing the system software as a collection of libraries impacts the nonvolatile memory size requirement. For the same code size, the amount of nonvolatile memory used will be higher due to the fact that code sections can be sized to be larger than the symbol libraries arranged within.

PMRTI is a very powerful runtime instruction engine. The handset can execute any instruction delivered to it through the PMRTI environment. This mechanism may be used to support RF calibrations and PRI updates. More generally, PMRTI can be used to remote debug wireless device software when software problems are recognized by the manufacturer or service provider, typically as the result of user complaints. PMRTI can also record data needed to diagnose software problems. PMRTI can launch newly downloaded system applications for data analysis, debugging, and fixes. PMRTI can provide RW data based updates for analysis and possible short term fix to a problem in lieu of an updated system software code section. PMRTI can provide memory compaction algorithms for use by the wireless device.

Once software updates have been delivered to the wireless device, the software maintenance system 100 supports memory compaction. Memory compaction is similar to disk de-fragmentation applications in desktop computers. The compaction mechanism ensures that memory is optimally used and is well balanced for future code section updates, where the size of the updated code sections are unpredictable. The system 100 analyzes the code storage section as it is being patched (updated). The system 100 attempts to fit updated code sections into the memory space occupied by the code section being replaced. If the updated code section is larger than the code section being replaced, the system 100 compacts the code sections in memory 112. Alternately, the compaction can be calculated by the manufacturer or service provider, and compaction instructions can be transported to the wireless device 104.

Compaction can be a time consuming process owing to the complexity of the algorithm and also the vast volume of data movement. The compaction algorithm predicts feasibility before it begins any processing. UI prompts can be used to apply for permission from the user before the compaction is attempted.

In some aspects of the invention, all the system software code sections can be updated simultaneously. A complete system software upgrade, however, would require a larger FSS 110.

Figure 3:
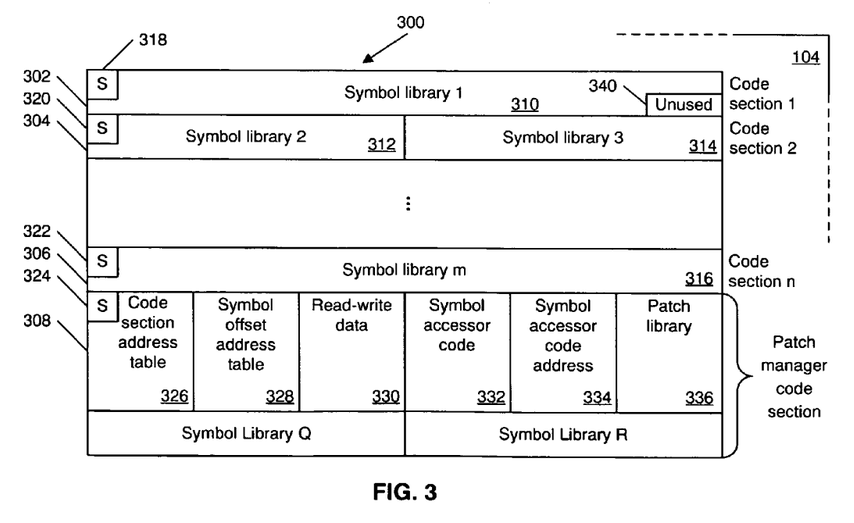
FIG. 3 is a schematic block diagram illustrating the present invention system for updating system software in a wireless communications device.

FIG. 3 is a schematic block diagram illustrating the present invention system for updating system software in a wireless communications device. The system 300 comprises a code storage section 112 in memory 108 including executable wireless device system software differentiated into a plurality of current code sections. Code section one (302), code section two (304), code section n (306), and a patch manager code section 308 are shown. However, the invention is not limited to any particular number of code sections. Further, the system 300 further comprises a first plurality of symbol libraries arranged into the second plurality of code sections. Shown are symbol library one (310) arranged in code section one (302), symbol libraries two (312) and three (314) arranged in code section two (304), and symbol library m (316) arranged in code section n (306). Each library comprises symbols having related functionality. For example, symbol library one (310) may be involved in the operation of the wireless device liquid crystal display (LCD). Then, the symbols would be associated with display functions. As explained in detail below, additional symbol libraries are arranged in the patch manger code section 308.

Figure 4:
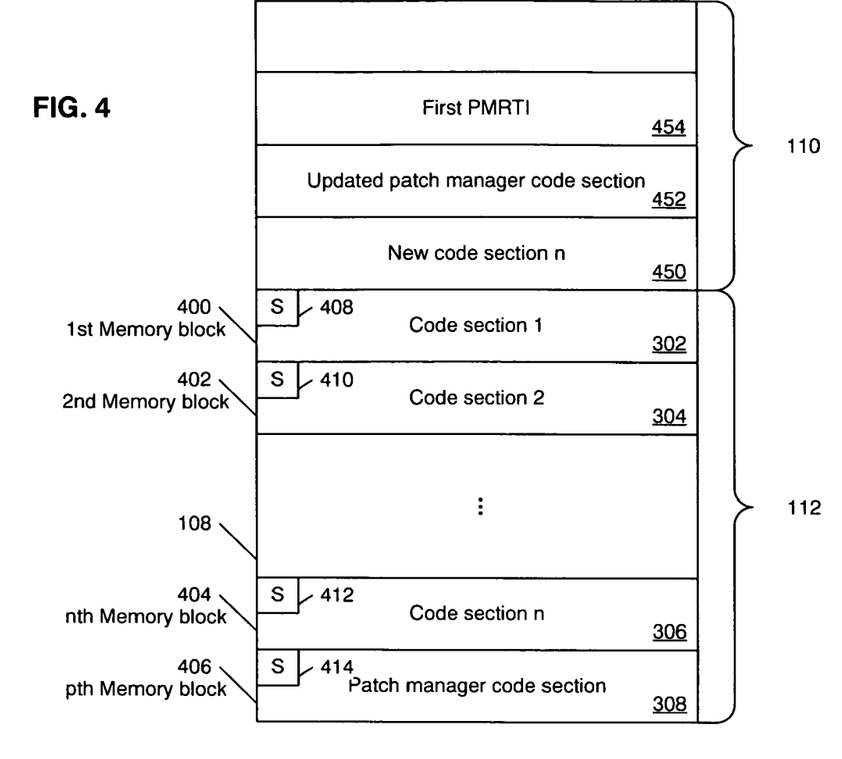
FIG. 4 is a schematic block diagram of the wireless device memory.

FIG. 4 is a schematic block diagram of the wireless device memory. As shown, the memory is the code storage section 112 of FIG. 1. The memory is a writeable, nonvolatile memory, such as Flash memory. It should be understood that the code sections need not necessarily be stored in the same memory as the FSS 110. It should also be understood that the present invention system software structure could be enabled with code sections stored in a plurality of cooperating memories. The code storage section 112 includes a second plurality of contiguously addressed memory blocks, where each memory block stores a corresponding code section from the second plurality of code sections. Thus, code section one (302) is stored in a first memory block 400, code section two (304) in the second memory block 402, code section n (306) in the nth memory block 404, and the patch manager code section (308) in the pth memory block 406.

Contrasting FIGS. 3 and 4, the start of each code section is stored at corresponding start addresses in memory, and symbol libraries are arranged to start at the start of code sections. That is, each symbol library begins at a first address and runs through a range of addresses in sequence from the first address. For example, code section one (302) starts at the first start address 408 (marked with "S") in code storage section memory 112. In FIG. 3, symbol library one (310) starts at the start 318 of the first code section. Likewise code section two (304) starts at a second start address 410 (FIG. 4), and symbol library two starts at the start 320 of code section two (FIG. 3). Code section n (306) starts at a third start address 412 in code storage section memory 112 (FIG. 4), and symbol library m (316) starts at the start of code section n 322 (FIG. 3). The patch manager code section starts at pth start address 414 in code storage section memory 112, and the first symbol library in the patch manager code section 308 starts at the start 324 of the patch manager code section. Thus, symbol library one (310) is ultimately stored in the first memory block 400. If a code section includes a plurality of symbol libraries, such as code section two (304), the plurality of symbol libraries are stored in the corresponding memory block, in this case the second memory block 402.

In FIG. 3, the system software structure 300 further comprises a code section address table 326 as a type of symbol included in a symbol library arranged in the patch manager code section 308. The code section address table cross-references code section identifiers with corresponding code section start addresses in memory.

Figure 5:
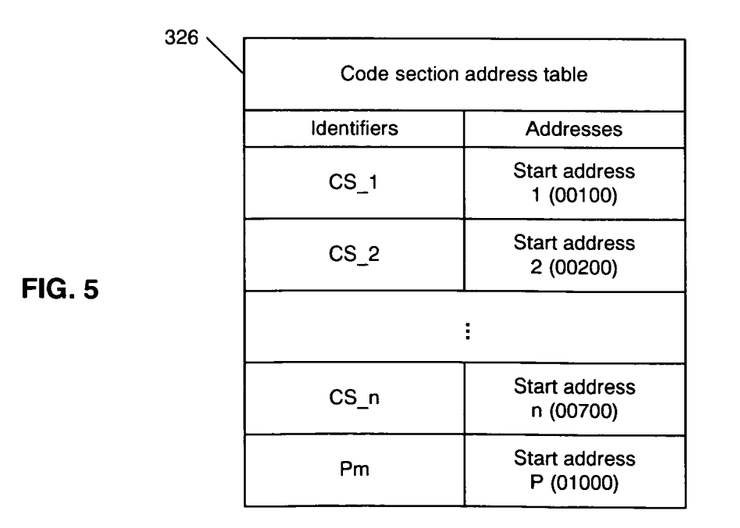
FIG. 5 is a table representing the code section address table of FIG. 3.

FIG. 5 is a table representing the code section address table 326 of FIG. 3. The code section address table 326 is consulted to find the code section start address for a symbol library. For example, the system 300 seeks code section one when a symbol in symbol library one is required for execution. To find the start address of code section one, and therefore locate the symbol in symbol library one, the code section address table 326 is consulted. The arrangement of symbol libraries in code sections, and the tracking of code sections with a table permits the code sections to be moved or expanded. The expansion or movement operations may be needed to install upgraded code sections (with upgraded symbol libraries).

Returning to FIG. 3, it should be noted that not every symbol library necessarily starts at the start of a code section. As shown, symbol library three (314) is arranged in code section two (304), but does not start of the code section start address 320. Thus, if a symbol in symbol library 3 (314) is required for execution, the system 300 consults the code section address table 326 for the start address of code section two (304). As explained below, a symbol offset address table permits the symbols in symbol library three (314) to be located. It does not matter that the symbols are spread across multiple libraries, as long as they are retained with the same code section.

As noted above, each symbol library includes functionally related symbols. A symbol is a programmer-defined name for locating and using a routine body, variable, or data structure. Thus, a symbol can be an address or a value. Symbols can be internal or external. Internal symbols are not visible beyond the scope of the current code section. More specifically, they are not sought by other symbol libraries, in other code sections. External symbols are used and invoked across code sections and are sought by libraries in different code sections. The symbol offset address table typically includes a list of all external symbols.

For example, symbol library one (310) may generate characters on a wireless device display. Symbols in this library would, in turn, generate telephone numbers, names, the time, or other display features. Each feature is generated with routines, referred to herein as a symbol. For example, one symbol in symbol library one (310) generates telephone numbers on the display. This symbol is represented by an "X", and is external. When the wireless device receives a phone call and the caller ID service is activated, the system must execute the "X" symbol to generate the number on the display. Therefore, the system must locate the "X" symbol.

Figure 6:
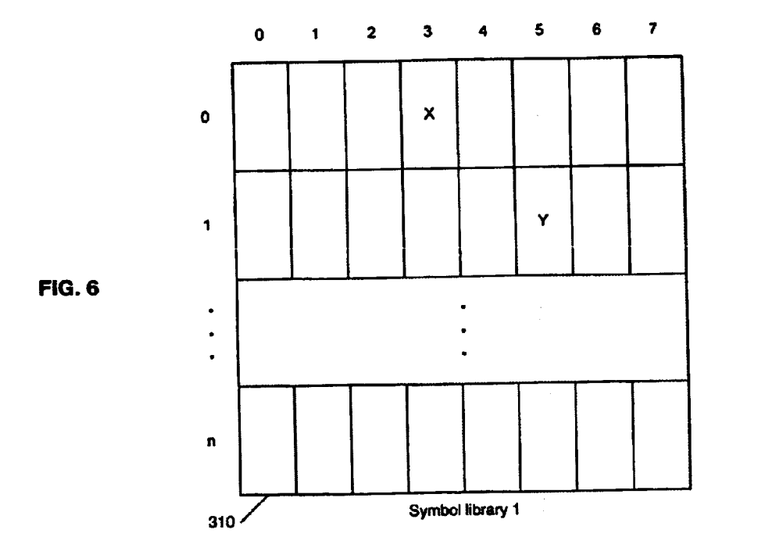
FIG. 6 is a detailed depiction of symbol library one of FIG. 3, with symbols.

FIG. 6 is a detailed depiction of symbol library one (310) of FIG. 3, with symbols. Symbols are arranged to be offset from respective code section start addresses. In many circumstances, the start of the symbol library is the start of a code section, but this is not true if a code section includes more than one symbol library. Symbol library one (310) starts at the start of code section one (see FIG. 3). As shown in FIG. 6, the "X" symbol is located at an offset of (03) from the start of the symbol library and the "Y" symbol is located at an offset of (15). The symbol offset addresses are stored in a symbol offset address table 328 in the patch manager code section (see FIG. 3).

Figure 7:
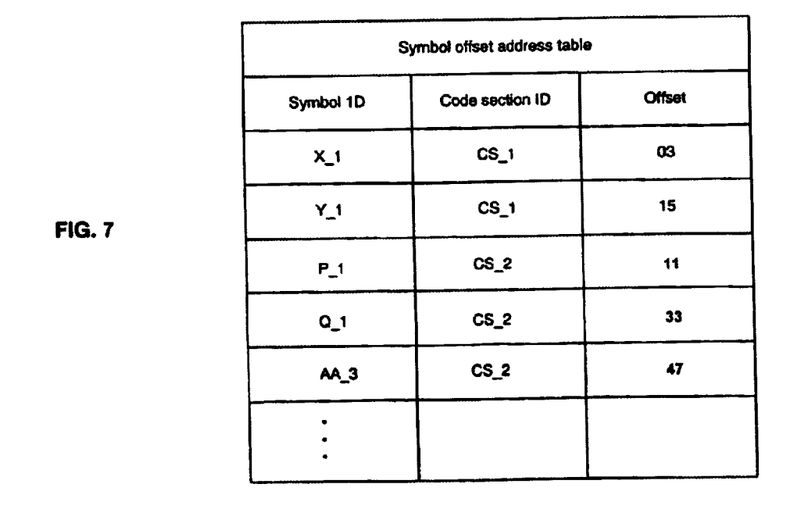
FIG. 7 is a table representing the symbol offset address table of FIG. 3.

FIG. 7 is a table representing the symbol offset address table 328 of FIG. 3. The symbol offset address table 328 cross-references symbol identifiers with corresponding offset addresses, and with corresponding code section identifiers in memory. Thus, when the system seeks to execute the "X" symbol in symbol library one, the symbol offset address table 328 is consulted to located the exact address of the symbol, with respect to the code section in which it is arranged.

Returning to FIG. 3, the first plurality of symbol libraries typically all include read-write data that must be consulted or set in the execution of these symbol libraries. For example, a symbol library may include an operation dependent upon a conditional statement. The read-write data section is consulted to determine the status required to complete the conditional statement. The present invention groups the read-write data from all the symbol libraries into a shared read-write section. In some aspects of the invention, the read-write data 330 is arranged in the patch manager code section 308. Alternately (not shown), the read-write data can be arranged in a different code section, code section n (306), for example.

The first plurality of symbol libraries also includes symbol accessor code arranged in a code section to calculate the address of a sought symbol. The symbol accessor code can be arranged and stored at an address in a separate code section, code section 2 (304), for example. However, as shown, the symbol accessor code 332 is arranged and stored at an address in the patch manager code section 308. The system software structure 300 further comprises a first location for storage of the symbol accessor code address. The first location can be a code section in the code storage section 112, or in a separate memory section of the wireless device (not shown). The first location can also be arranged in the same code section as the read-write data. As shown, the first location 334 is stored in the patch manager code section 308 with the read-write data 330, the symbol offset address table 328, the code section address table 326, and the symbol accessor code 332, and the patch library (patch symbol library) 336.

The symbol accessor code accesses the code section address table and symbol offset address tables to calculate, or find the address of a sought symbol in memory. That is, the symbol accessor code calculates the address of the sought symbol using a corresponding symbol identifier and a corresponding code section identifier. For example, if the "X" symbol in symbol library one is sought, the symbol accessor is invoked to seek the symbol identifier (symbol ID) X_1, corresponding to the "X" symbol (see FIG. 7). The symbol accessor code consults the symbol offset address table to determine that the X_1 symbol identifier has an offset of (03) from the start of code section one (see FIG. 6). The symbol accessor code is invoked to seek the code section identifier CS_1, corresponding to code section one. The symbol accessor code consults the code section address table to determine the start address associated with code section identifier (code section ID) CS_1. In this manner, the symbol accessor code determines that the symbol identifier X_1 is offset (03) from the address of (00100), or is located at address (00103).

The symbol "X" is a reserved name since it is a part of the actual code. In other words, it has an absolute data associated with it. The data may be an address or a value. The symbol identifier is an alias created to track the symbol. The symbol offset address table and the code section address table both work with identifiers to avoid confusion with reserved symbol and code section names. It is also possible that the same symbol name is used across many symbol libraries. The use of identifiers prevents confusion between these symbols.

Returning to FIG. 1, the system software structure 300 further comprises a read-write volatile memory 114, typically random access memory (RAM). The read-write data 330, code section address table 326, the symbol offset address table 328, the symbol accessor code 332, and the symbol accessor code address 334 are loaded into the read-write volatile memory 114 from the patch manager section for access during execution of the system software. As is well known, the access times for code stored in RAM is significantly less than the access to a nonvolatile memory such as Flash.

Returning to FIG. 3, it can be noted that the symbol libraries need not necessarily fill the code sections into which they are arranged, although the memory blocks are sized to exactly accommodate the corresponding code sections stored within. Alternately stated, each of the second plurality of code sections has a size in bytes that accommodates the arranged symbol libraries, and each of the contiguously addressed memory blocks have a size in bytes that accommodates corresponding code sections. For example, code section one (302) may be a 100 byte section to accommodate a symbol library having a length of 100 bytes. The first memory block would be 100 bytes to match the byte size of code section one. However, the symbol library loaded into code section 1 may be smaller than 100 bytes. As shown in FIG. 3, code section one (302) has an unused section 340, as symbol library one (310) is less than 100 bytes. Thus, each of the second plurality of code sections may have a size larger than the size needed to accommodate the arranged symbol libraries. By "oversizing" the code sections, larger updated symbol libraries can be accommodated.

As seen in FIG. 3, the system 300 includes a patch symbol library, which will be referred to herein as patch library 336, to arrange new code sections in the code storage section with the current code sections. The arrangement of new code sections with current code sections in the code storage section forms updated executable system software. The patch manager 336 not only arranges new code sections in with the current code sections, it also replaces code sections with updated code sections.

Returning to FIG. 4, the file system section 110 of memory 108 receives new code sections, such as new code section 450 and updated patch manager code section 452. The file system section also receives a first patch manager instruction set (PMRTI) 454 including instructions for arranging the new code sections with the current code sections. As seen in FIG. 1, an airlink interface 150 receives new, or updated code sections, as well as the first PMRTI. Although the airlink interface 150 is being represented by an antenna, it should be understood that the airlink interface would also include an RF transceiver, baseband circuitry, and demodulation circuitry (not shown). The file system section 110 stores the new code sections received via the airlink interface 150. The patch library 336, executing from read-write volatile memory 114, replaces a first code section in the code storage section, code section n (306) for example, with the new, or updated code section 450, in response to the first PMRTI 454. Typically, the patch manager code section 308 is replaced with the updated patch manager code section 452. When code sections are being replaced, the patch library 336 over-writes the first code section, code section n (306) for example, in the code storage section 112 with the updated code sections, code section 450 for example, in the file system section 110. In the extreme case, all the code sections in code storage section 112 are replaced with updated code sections. That is, the FSS 110 receives a second plurality of updated code sections (not shown), and the patch library 336 replaces the second plurality of code sections in the code storage section 112 with the second plurality of updated code sections. Of course, the FSS 110 must be large enough to accommodate the second plurality of updated code sections received via the airlink interface.

As noted above, the updated code sections being received may include read-write data code sections, code section address table code sections, symbol libraries, symbol offset address table code sections, symbol accessor code sections, or a code section with a new patch library. All these code sections, with their associated symbol libraries and symbols, may be stored as distinct and independent code sections. Then each of these code sections would be replaced with a unique updated code section. That is, an updated read-write code section would be received and would replace the read-write code section in the code storage section. An updated code section address table code section would be received and would replace the code section address table code section in the code storage section. An updated symbol offset address table code section would be received and would replace the symbol offset address table code section in the code storage section. An updated symbol accessor code section would be received and would replace the symbol accessor code section in the code storage section. Likewise, an updated patch manager code section (with a patch library) would be received and would replace the patch manager code section in the code storage section.

However, the above-mentioned code sections are typically bundled together in the patch manager code section. Thus, the read-write code section in the code storage section is replaced with the updated read-write code section from the file system section 110 when the patch manager code section 308 is replaced with the updated patch manger code section 450. Likewise, the code section address table, the symbol offset address table, the symbol accessor code sections, as well as the patch library are replaced when the updated patch manager code section 450 is installed. The arrangement of the new read-write data, the new code section address table, the new symbol offset address table, the new symbol accessor code, and the new patch library as the updated patch manager code section 450, together with the current code sections in the code storage section, forms updated executable system software.

When the file system section 110 receives an updated symbol accessor code address, the patch manager replaces the symbol accessor code address in the first location in memory with updated symbol accessor code address. As noted above, the first location in memory 334 is typically in the patch manager code section (see FIG. 3).

Figure 8A:
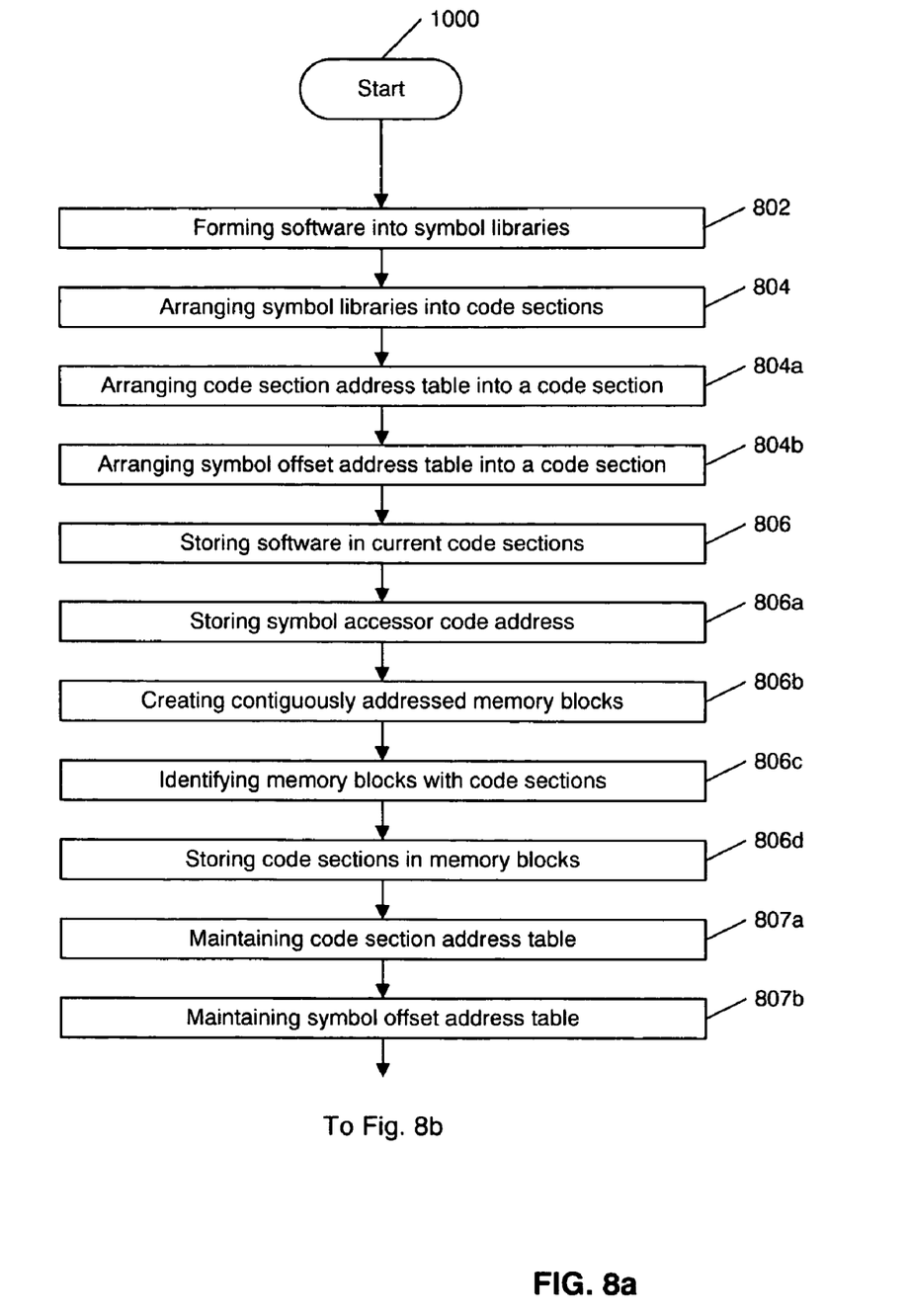
FIGS. 8a through 8c are flowcharts illustrating the present invention method for updating system software in a wireless communications device memory.
Figure 8B:
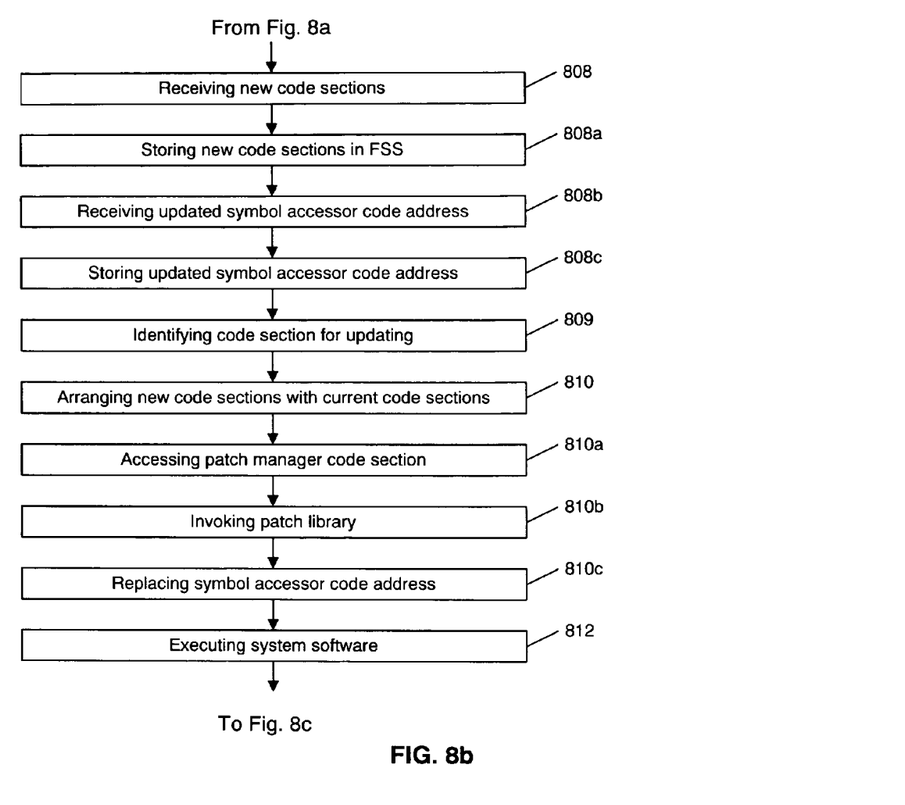
Figure 8C:
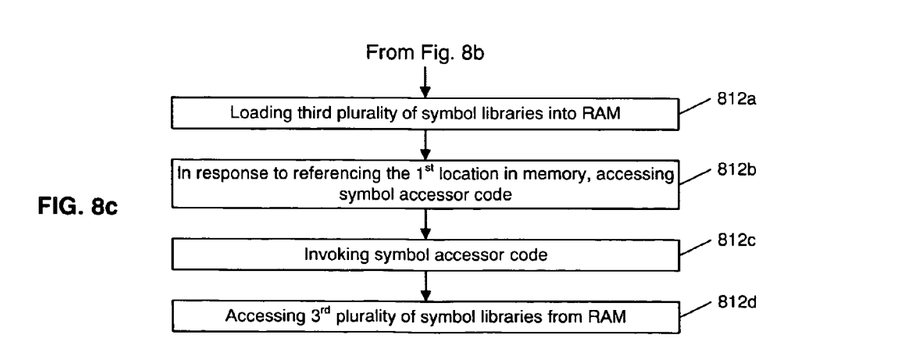

FIGS. 8a through 8c are flowcharts illustrating the present invention method for updating system software in a wireless communications device memory. Although the method is depicted as a sequence of numbered steps for clarity, no order should be inferred from the numbering unless explicitly stated. The method begins at Step 800. Step 802 forms the system software into a first plurality of symbol libraries, each symbol library comprising at least one symbol. Further, forming system software into a first plurality of symbol libraries includes each symbol library comprising symbols having related functionality. Step 804 arranges the first plurality of symbol libraries into a second plurality of code sections. Step 806 stores system software for the wireless device in a plurality of current code sections. Step 808 receives a new code section via a wireless communications device air interface. Step 810 arranges the new code section with current code sections to form updated system software for the wireless device. Step 812 executes the updated system software.

In some aspects of the invention, Step 809 identifies a first code section for updating. Then, arranging new code section with current code sections in Step 810 includes replacing the first code section with the new code section. Executing the updated system software in Step 812 includes using the new code section in executing the updated system software. When Step 806 stores system software for the wireless device in a second plurality of current code sections and a second plurality of updated code sections are received in Step 808, then Step 810 includes replacing the second plurality of current code sections with the second plurality of updated code sections, and Step 812 uses the second plurality of updated code sections in executing the updated system software.

In some aspects, forming system software into a first plurality of symbol libraries in Step 802 includes forming read-write data for a plurality of symbol libraries. Then, arranging the first plurality of symbol libraries into a second plurality of code sections in Step 804 includes arranging the read-write data in a shared read-write code section. Receiving a new code section in Step 808 includes receiving an updated read-write code section, and identifying a first code section for updating in Step 809 includes identifying the read-write code section. Arranging the new code section with current code sections to form updated system software in Step 810 includes replacing the read-write code section with the updated read-write code section. Executing the updated system software in Step 812 includes using the updated read-write code section in executing of the updated system software.

In some aspects of the invention, arranging the first plurality of symbol libraries into a second plurality of code sections in Step 804 includes starting symbol libraries at the start of code sections. Storing system software for the wireless device in a plurality of current code sections in Step 806 includes storing the start of code sections at corresponding start addresses. Then, a further step, Step 807a maintains a code section address table cross-referencing code section identifiers with corresponding start addresses.

In some aspects of the invention, arranging the first plurality of symbol libraries into a second plurality of code sections in Step 804 includes arranging each symbol to be offset from its respective code section start address. Then, a further step, Step 807b maintains a symbol offset address table cross-referencing symbol identifiers with corresponding offset addresses, and corresponding code section identifiers.

Arranging the first plurality of symbol libraries into a second plurality of code sections in Step 804 includes substeps. Step 804a arranges the code section address table in a first table code section, Step 804b arranges the symbol offset address table in a second table code section. Receiving an updated code section in Step 808 includes receiving an updated first table code section and an updated second table code section. Arranging the new code section with current code sections to form updated system software in Step 810 includes replacing the first table code section with the updated first table code section, and the second table code section with the updated second table code section. Executing the updated system software in Step 812 includes using the updated first table code section and updated second table code section in executing the updated system software.

In some aspects of the invention forming system software into a first plurality of symbol libraries in Step 802 includes forming a patch library, or patch symbol library. Arranging the first plurality of symbol libraries into a second plurality of code sections in Step 804 includes arranging a patch library into a patch manager code section. Arranging the new code section with current code sections to form updated system software for the wireless device includes substeps. Step 810a accesses the patch manager code section. Step 810b invokes the patch library to store the new code section. Invoking the patch library to store the new code section in Step 810b typically includes invoking the patch library to over-write the first code section with the new code section.

In some aspects, Step 808a, after receiving the new code section in Step 808, stores the new code section in a memory file system section. Arranging the new code section with current code sections to form updated system software in Step 810 includes invoking the patch library to over-write the first code section with the new code section stored in the memory file system section.

In other aspects of the invention, receiving a new code section in Step 808 includes receiving an updated patch manager code section. Arranging the new code section with current code sections to form updated system software in Step 810 includes replacing the patch manager code section with the updated patch manager code section. Executing the updated system software in Step 812 includes using the updated patch manager code in executing the updated system software.

Typically, Step 804 includes arranging read-write data, the code section address table, and the symbol offset address table in the patch manager code section. Then, receiving an updated patch manager code section in Step 808 includes receiving an updated symbol offset address table, an updated code section address table, and updated read-write data.

In some aspects of the invention forming system software into a first plurality of symbol libraries in Step 802 includes forming a symbol accessor code, and arranging the first plurality of symbol libraries into a second plurality of code sections in Step 804 includes arranging the symbol accessor code in the patch manager code section. Then, a further step, Step 806a stores the symbol accessor code address at a first location in memory. Executing the updated system software in Step 812 includes substeps. Step 812a loads a third plurality of symbol libraries into read-write volatile memory, typically RAM. It should be understood that not all the symbol libraries in the patch manager code section are necessarily loaded in the read-write volatile memory. Further, symbol libraries in other code sections besides the patch manager code section can be loaded into the read-write volatile memory. Step 812b, in response to referencing the first location in memory, accesses the symbol accessor code. Step 812c invokes the symbol accessor code to calculate the address of a sought symbol using a corresponding symbol identifier. Invoking the symbol accessor code to calculate the address of the sought symbol includes accessing the code section address table and the symbol offset address table to calculate the address of the sought symbol. Step 812d accesses the third plurality of symbol libraries from RAM.

Typically, receiving an updated patch manager code section in Step 808 includes receiving an updated symbol accessor code. Replacing the patch manager code section with the updated patch manager code section in Step 810 includes replacing the symbol accessor code with updated symbol accessor code. Then, executing the updated system software in Step 812 includes using the updated symbol accessor code in executing the updated system software.

Some aspects of the invention include further steps. Step 808b receives an updated symbol accessor code address. Step 808c stores the updated symbol accessor code address in the file system section. Step 810c replaces the symbol accessor code address in the first location in memory with updated symbol accessor code address from the file system section. Then, executing the updated system software in Step 812 includes using the updated symbol accessor code address in executing the updated system software.

Typically, arranging the first plurality of symbol libraries into a second plurality of code sections in Step 804 includes arranging the symbol accessor code address in the patch manager code section. Then, replacing the symbol accessor code address in the first location in memory with updated symbol accessor code address from the file system section in Step 810c includes replacing the symbol accessor code address in the patch manager code section with the updated symbol accessor code address in an updated patch manager code section.

In some aspects, Step 812a loads the read-write data, the code section address table, the symbol offset address table, the patch library, symbol accessor code, and a symbol accessor code address from the patch manager code section into read-write volatile memory. Step 812d accesses the read-write data, the code section address table, the symbol offset address table, patch library, the symbol accessor code, and the symbol accessor code address from the read-write volatile memory.

Storing the start of code sections at corresponding start addresses in Step 806 includes substeps. Step 806b creates a second plurality of contiguously addressed memory blocks. Step 806c identifies each memory block with a corresponding code section. Step 806d stores code sections in the identified memory blocks.

In some aspects, arranging the first plurality of symbol libraries into a second plurality of code sections in Step 804 includes arranging a third plurality of symbol libraries in a first code section. Identifying each memory block with a corresponding code section in Step 806c includes identifying a first memory block with the first code section. Storing code sections in the identified memory blocks in Step 806d includes storing the third plurality of symbol libraries in the first memory block. Receiving a new code section in Step 808 includes receiving an updated first code section with third plurality of symbol libraries arranged within. Then, arranging the new code section with current code sections to form updated system software for the wireless device in Step 810 includes overwriting the first code section in the first memory block with an updated first code section.

In other aspects, arranging the first plurality of symbol libraries into a second plurality of code sections in Step 804 includes arranging a first symbol library in a first code section. Identifying each memory block with a corresponding code section in Step 806c includes identifying a first memory block with the first code section. Storing code sections in the identified memory blocks in Step 806d includes storing the first symbol library in the first memory block. Receiving a new code section in Step 808 includes receiving an updated first code section with first symbol library arranged within. Then, arranging the new code section with current code sections to form updated system software for the wireless device in Step 810 includes overwriting the first code section in the first memory block with an updated first code section.

Arranging the first plurality of symbol libraries into a second plurality of code sections in Step 804 includes sizing the code sections to accommodate arranged symbol libraries. Then, creating a second plurality of contiguously addressed memory blocks in Step 806b includes sizing memory blocks to accommodate corresponding code sections. Alternately, arranging the first plurality of symbol libraries into a second plurality of code sections in Step 804 includes sizing the code sections to accommodate sizes larger than the arranged symbol libraries.

A system and method have been provided for an updateable system software structure for use in a wireless communications device. The system is easily updateable because of the arrangement of symbol libraries in code sections, with tables to access the start addresses of the code sections in memory and the offset addresses of symbols in the symbol libraries. Although a few examples of these library arrangements and cross-referencing tables have been given for a display function, the present invention is not limited to just these examples. Other variations and embodiments of the invention will occur to those skilled in the art.

We claim:

1. In a wireless communications device, a method for updating system software stored in memory, the method comprising: storing system software for the wireless device in a plurality of current code sections; receiving a new code section; arranging the new code section with current code sections to form updated system software for the wireless device; executing the updated system software, forming the system software into a first plurality of symbol libraries, each symbol library comprising at least one symbol; and, arranging the first plurality of symbol libraries into a second plurality of code sections.

2. The method of claim 1 wherein forming system software into a first plurality of symbol libraries includes each symbol library comprising symbols having related functionality.

3. The method of claim 2 wherein receiving a new code section includes receiving the new code section via a wireless communications device air interface.

4. The method of claim 3 wherein forming system software into a first plurality of symbol libraries includes forming read-write data for a plurality of symbol libraries; and, wherein arranging the first plurality of symbol libraries into a second plurality of code sections includes arranging the read-write data in a shared read-write code section.

5. The method of claim 4 wherein receiving a new code section includes receiving an updated read-write code section.

6. The method of claim 5 wherein identifying a first code section for updating includes identifying the read-write code section; wherein arranging the new code section with current code sections to form updated system software includes replacing the read-write code section with the updated read-write code section; and wherein executing the updated system software includes using the updated read-write code section in executing of the updated system software.

7. The method of claim 6 wherein arranging the first plurality of symbol libraries into a second plurality of code sections includes starting symbol libraries at the start of code sections; the method further comprising: storing the start of code sections at corresponding start addresses; and, maintaining a code section address table cross-referencing code section identifiers with corresponding start addresses.

8. The method of claim 7 wherein arranging the first plurality of symbol libraries into a second plurality of code sections includes arranging each symbol to be offset from its respective code section start address; and the method further comprising: maintaining a symbol offset address table cross-referencing symbol identifiers with corresponding offset addresses, and corresponding code section identifiers.

9. The method of claim 8 wherein arranging the first plurality of symbol libraries into a second plurality of code sections includes: arranging the code section address table in a first table code section; and, arranging the symbol offset address table in a second table code section.

10. The method of claim 9 wherein receiving an updated code section includes receiving an updated first table code section and an updated second table code section; wherein arranging the new code section with current code sections to form updated system software includes replacing the first table code section with the updated first table code section, and the second table code section with the updated second table code section; and, wherein executing the updated system software includes using the updated first table code section and updated second table code section in executing the updated system software.

11. The method of claim 10 wherein forming system software into a first plurality of symbol libraries includes forming a patch library; wherein arranging the first plurality of symbol libraries into a second plurality of code sections includes arranging a patch library into a patch manager code section; wherein arranging the new code section with current code sections to form updated system software for the wireless device includes: accessing the patch manager code section; and, invoking the patch library to store the new code section.

12. The method of claim 11 wherein invoking the patch library to store the new code section includes invoking the patch library to over-write the first code section with the new code section.

13. The method of claim 12 further comprising: after receiving the new code section, storing the new code section in a memory file system section; and, wherein arranging the new code section with current code sections to form updated system software includes invoking the patch library to over-write the first code section with the new code section stored in the memory file system section.

14. The method of claim 13 wherein receiving a new code section includes receiving an updated patch manager code section; wherein arranging the new code section with current code sections to form updated system software includes replacing the patch manager code section with the updated patch manager code section; and, wherein executing the updated system software includes using the updated patch manager code section in executing the updated system software.

15. The method of claim 14 wherein arranging the first plurality of symbol libraries into a second plurality of code sections includes arranging read-write data, the code section address table, and the symbol offset address table in the patch manager code section; and, wherein receiving an updated patch manager code section includes receiving an updated symbol offset address table, an updated code section address table, and updated read-write data.

16. The method of claim 14 wherein forming system software into a first plurality of symbol libraries includes forming a symbol accessor code; wherein arranging the first plurality of symbol libraries into a second plurality of code sections includes arranging the symbol accessor code in the patch manager code section; and, the method further comprising: storing the symbol accessor code address at a first location in memory; wherein executing the updated system software includes: in response to referencing the first location in memory, accessing the symbol accessor code; and, invoking the symbol accessor code to calculate the address of a sought symbol using a corresponding symbol identifier, and a corresponding code section identifier.

17. The method of claim 16 wherein invoking the symbol accessor code to calculate the address of the sought symbol includes accessing the code section address table and the symbol offset address table to calculate the address of the sought symbol.

18. The method of claim 17 wherein receiving an updated patch manager code section includes receiving an updated symbol accessor code; wherein replacing the patch manager code section with updated patch manager code section includes replacing the symbol accessor code with updated symbol accessor code; and, wherein executing the updated system software includes using the updated symbol accessor code in executing the updated system software.

19. The method of claim 18 further comprising: receiving an updated symbol accessor code address; storing the updated symbol accessor code address in the file system section; replacing the symbol accessor code address in the first location in memory with updated symbol accessor code address from the file system section; and, wherein executing the updated system software includes using the updated symbol accessor code address in executing the updated system software.

20. The method of claim 19 wherein arranging the first plurality of symbol libraries into a second plurality of code sections includes arranging the symbol accessor code address in the patch manager code section; and, wherein replacing the symbol accessor code address in the first location in memory with the updated symbol accessor code address from the file system section includes replacing the symbol accessor code address in the patch manager code section with the updated symbol accessor code address in an updated patch manager code section.

21. The method of claim 20 wherein executing the system software includes: loading the read-write data, the code section address table, the symbol offset address table, the patch library, symbol accessor code, and a symbol accessor code address from the patch manager code section into read-write volatile memory; and, accessing the read-write data, the code section address table, the symbol offset address table, patch library, the symbol accessor code, and the symbol accessor code address from read-write volatile memory.

22. The method of claim 21 wherein storing the start of code sections at corresponding start addresses includes: creating a second plurality of contiguously addressed memory blocks; identifying each memory block with a corresponding code section; and, storing code sections in the identified memory blocks.

23. The method of claim 22 wherein arranging the first plurality of symbol libraries into a second plurality of code sections includes arranging a third plurality of symbol libraries in a first code section; wherein identifying each memory block with a corresponding code section includes identifying a first memory block with the first code section; wherein storing code sections in the identified memory blocks includes storing the third plurality of symbol libraries in the first memory block; wherein receiving a new code section includes receiving an updated first code section with third plurality of symbol libraries arranged within; and, wherein arranging the new code section with current code sections to form updated system software for the wireless device includes overwriting the first code section in the first memory block with an updated first code section.

24. The method of claim 22 wherein arranging the first plurality of symbol libraries into a second plurality of code sections includes arranging a first symbol library in a first code section; wherein identifying each memory block with a corresponding code section includes identifying a first memory block with the first code section; wherein storing code sections in the identified memory blocks includes storing the first symbol library in the first memory block; wherein receiving a new code section includes receiving an updated first code section with first symbol library arranged within; and, wherein arranging the new code section with current code sections to form updated system software for the wireless device includes overwriting the first code section in the first memory block with an updated first code section.

25. The method of claim 22 wherein arranging the first plurality of symbol libraries into a second plurality of code sections includes sizing the code sections to accommodate arranged symbol libraries; and, wherein creating a second plurality of contiguously addressed memory blocks includes sizing memory blocks to accommodate corresponding code sections.

26. The method of claim 25 wherein arranging the first plurality of symbol libraries into a second plurality of code sections includes sizing the code sections to accommodate sizes larger than the arranged symbol libraries.

27. The method of claim 1 wherein storing system software for the wireless device in a plurality of current code sections includes storing system software in a second plurality of code sections; wherein receiving a new code section includes receiving a second plurality of updated code sections; wherein arranging the new code section with the current code section includes replacing the second plurality of current code sections with the second plurality of updated code sections; and, wherein executing the updated system software includes using the second plurality of updated code sections in executing the updated system software.

28. In a wireless communications device, a method for updating system software stored in memory, the method comprising: storing system software for the wireless device in a plurality of current code sections; receiving new code sections via a wireless communications device air interface; storing the new code sections in a memory file system section; identifying a subset of the plurality of current code sections for updating; replacing the identified subset of the plurality of current code sections with new code sections to form updated system software for the wireless device; executing the updated system software forming the system software into a first plurality of symbol libraries including a code section address table, a symbol offset address table, a symbol accessor code, a patch library, and read-write data for a plurality of symbol libraries; and, arranging the code section address table, the symbol offset address table, the symbol accessor code, the read-write data, the patch library, and the symbol accessor code address into a patch manager code section; wherein receiving new code sections includes receiving a new patch manager code section; and, wherein replacing current code sections with new code sections to form updated system software for the wireless device includes replacing a current patch manger code section with the new patch manager code section.

29. In a wireless communications device, a software updating system, the system comprising: a code storage section memory including executable wireless device system software differentiated into a plurality of current code sections; a file system section memory for receiving new code sections; a patch library to arrange new code sections in the code storage section with the current code sections; and, wherein the arrangement of new code sections with current code sections in the code storage section forms updated executable system software, wherein the file system section receives a first patch manager instruction set (PM-RTI) including instruction for arranging the new code section with the current code sections; and wherein the patch library replaces the first code section in the code storage section with the new code section in response to the first PMRTI.

30. The system of claim 29 wherein the code storage section comprises a first plurality of symbol libraries, each symbol library comprising at least one symbol, the first plurality of symbol libraries arranged in a second plurality of code sections.

31. The system of claim 30 wherein the file system section receives a second plurality of updated code sections; and, wherein the patch library replaces the second plurality of code sections in the code storage section with the second plurality of updated code sections.

32. The system of claim 29 wherein each symbol library comprises symbols having related functionality.

33. The system of claim 29 further comprising: an airlink interface to receive new code sections; and, wherein the file system section stores the new code sections received via the airlink interface.

34. The system of claim 33 wherein the code storage section includes a shared read-write code section with the read-write data arranged within for the first plurality of symbol libraries.

35. The system of claim 34 wherein the file system section receives an updated read-write code section; wherein the patch library replaces the read-write code section in the code storage section with the updated read-write code section from the file system section; and, wherein the arrangement of the new read-write code section with the current code sections in the code storage section forms updated executable system software.

36. The system of claim 35 wherein symbol libraries are arranged to start at the start of code sections; and, wherein the code storage section includes a first table code section with a code section address table cross-referencing code section identifiers with corresponding start addresses.

37. The system of claim 36 wherein the symbol libraries include each symbol being offset from its respective code section start address; and, wherein the code storage section includes a second table code section with a symbol offset address table cross-referencing symbol identifiers with corresponding offset addresses, and corresponding code section identifiers.

38. The system of claim 37 wherein the file system section receives an updated first table code section and an updated second table code section; wherein the patch library replaces the first and second table code sections in the code storage section with the updated first and second table code sections from the file system section; and, wherein the arrangement of the new first and second table code sections with the current code sections in the code storage section forms updated executable system software.

39. The system of claim 38 wherein the patch library is a symbol library arranged in a patch manager code section of the code storage section.

40. The system of claim 39 wherein the file system section receives an updated first code section; and, wherein the patch library over-writes the first code section in the code storage section with the updated code sections in the file system section.

41. The system of claim 40 wherein the file system section receives an updated patch manager code section; wherein the patch library replaces the patch manager code section in the code storage section with the updated patch manager code section in the file system section; and, wherein the arrangement of the updated patch manager code section with the current code sections in the code storage section forms updated executable system software.

42. The system of claim 41 wherein the patch manager code section includes read-write data, the code section address table, and the symbol offset address table; and, wherein receiving an updated patch manager code section includes receiving an updated symbol offset address table, updated code section address table, and updated read-write data.

43. The system of claim 41 wherein the patch manager code section includes symbol accessor code to calculate the address of a sought symbol using a corresponding symbol identifier, and a corresponding code section identifier; and, the system further comprising: a first location in memory for storing the symbol accessor code address.

44. The system of claim 43 wherein the symbol accessor code calculates the address of the sought symbol by accessing the code section address table and the symbol offset address table.

45. The system of claim 44 wherein the file system section receives an updated patch manager code section with updated symbol accessor code wherein the patch library replaces the patch manager code section in the code storage section with the updated patch manager code section; and, wherein the arrangement of the updated symbol accessor code in the updated patch manager code section with the current code sections in the code storage section forms updated executable system software.

46. The system of claim 45 wherein the file system section receives an updated symbol accessor code address; and, wherein the patch library replaces the symbol accessor code address in the first location in memory with updated symbol accessor code address.

47. The system of claim 46 wherein the patch manager code section includes the first location in memory.

48. The system of claim 47 further comprising: a read-write volatile memory to accept the read-write data, the code section address table, the symbol offset address table, the patch library, symbol accessor code, and the symbol accessor code address from the patch manager code section for access during the execution of the system software.

49. The system of claim 48 wherein the code storage section includes a second plurality of contiguously addressed memory blocks identified with the corresponding second plurality of code sections.

50. The system of claim 49 wherein the code storage section includes code sections sized to accommodate the symbol libraries arranged within, and memory blocks sized to accommodate the corresponding code sections.

51. The system of claim 50 wherein the code storage section includes code sections sized to accommodate sizes larger than the symbol libraries arranged within.

52. In a wireless communications device, a software updating system, the system comprising: a code storage section memory including executable wireless device system software differentiated into a first plurality of symbol libraries arranged in a second plurality of code sections; an airlink interface to receive new code sections, including an updated patch manager code section; a file system section memory for storing new code sections received via the airlink interface; wherein the code storage section includes a patch manager code section with a patch library to replace code sections in the code storage section with updated code sections, the patch manager code section further including a code section address table, a symbol offset address table, a symbol accessor code, read-write data, and a symbol accessor code address; and, wherein the arrangement of the new code sections, including the updated patch manager code section, with current code sections in the code storage section forms updated executable system software.

* * * * *